Oct. 8, 1935.    G. M. McCOMB    2,016,334
ARTIFICIAL CHRISTMAS TREE
Filed March 17, 1934
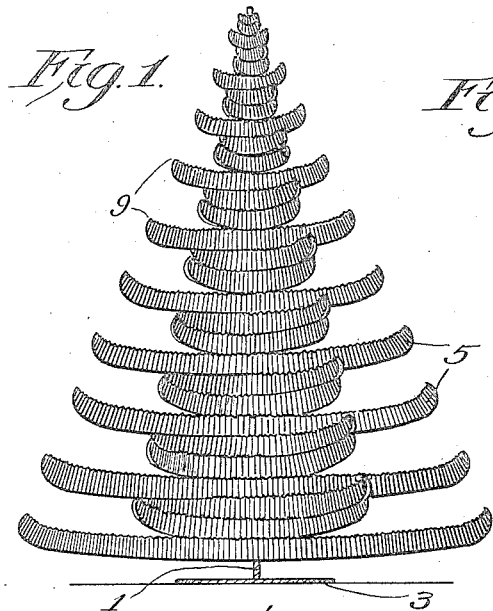
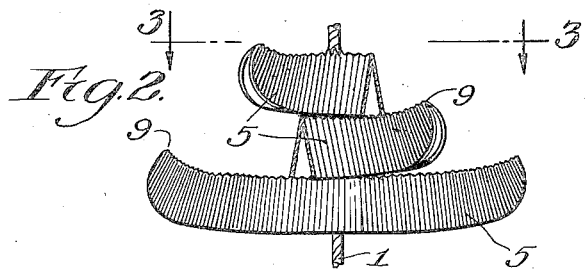
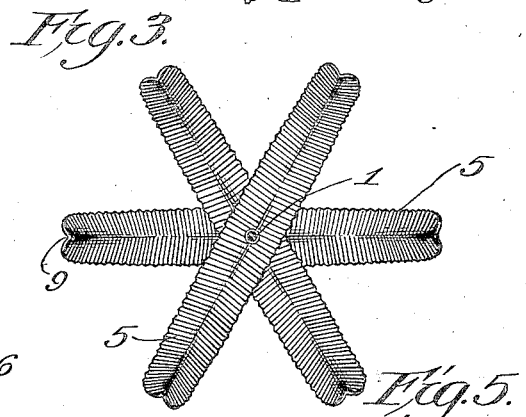
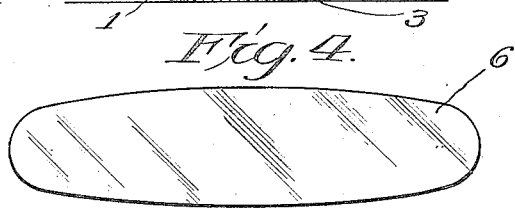
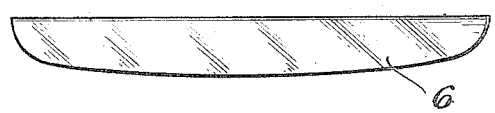
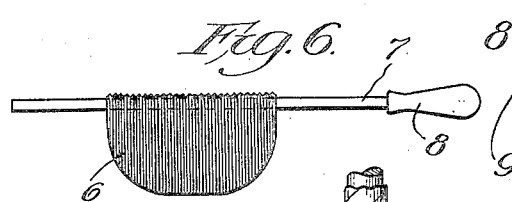
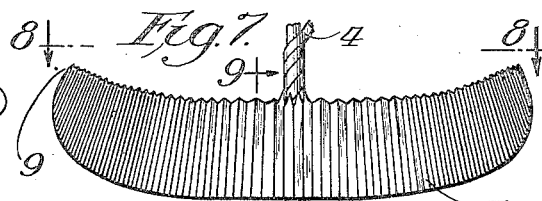
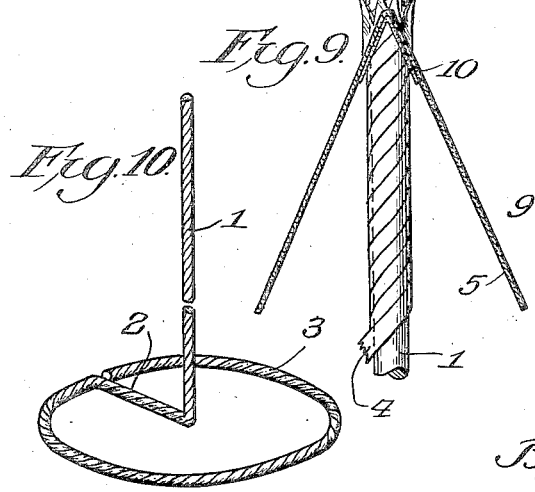
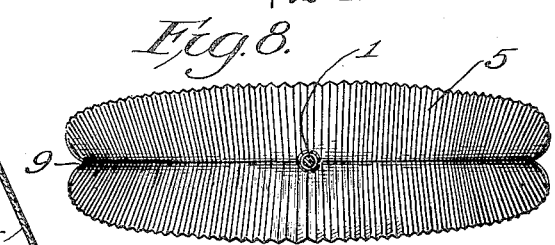
Inventor
Grace M. McComb,
By ............ Atty Patented Oct. 8, 1935

2,016,334

UNITED STATES PATENT OFFICE 2,016,334

ARTIFICIAL CHRISTMAS TREE

Grace M. McComb, Chicago, Ill.

Application March 17, 1934, Serial No. 716,061

5 Claims. (Cl. 41—15)

This invention relates to improvements in artificial Christmas trees, and more particularly, the invention has for an object to provide an artificial Christmas tree possessing highly ornamental characteristics, the branches of which are constituted of material capable of diffusing and refracting light rays directed thereonto in a manner such as will produce most pleasing shimmering-like eye effects.

It is also an object of the invention to provide a decorative artificial tree wherein the branches of the same are constructed of a material possessing such body, and in a manner that they will be rendered substantially form-sustaining when attached to the supporting stem or trunk of the tree, and yet, will also be sufficiently flexible or pliant to permit of their self arrangement or adjustment in graceful and artistic relative positions, hence, greatly increasing the ornamentality of the product and remarkably simulating, therefore, an actual tree.

Yet another object of the invention resides in the novel method of construction and/or formation of the tree branches, whereby, first, a self-sustaining curving formation is imparted thereto; second, the branches will present a vast multiplicity of light ray diffusing and refracting surfaces in order that glimmering eye effects will result to an observer when light is directed thereonto, and third, the branches, when they are attached to the tree stem or trunk, will be positively anchored and prevented from excessive sagging during a prolonged period of usage of the artificial tree.

Other objects of the invention will be in part obvious and in part pointed out hereinafter.

In order that the invention and its mode of operation may be readily understood by those skilled in the art to which it appertains, I have in the accompanying drawing and in the detailed description based thereupon, set out one embodiment of my invention.

In this drawing:

Figure 1 is a side elevation of my improved artificial Christmas tree;

Figure 2 is an enlarged fragmentary vertical section taken through a portion of the artificial Christmas tree;

Figure 3 is a horizontal section taken on the line 3—3 of Figure 2, looking in the direction in which the arrows point;

Figure 4 is a plan view of a blank form or body such as is used in constructing or forming the artificial tree branches;

Figure 5 is a side elevation of the branch form or blank following the medial longitudinal folding thereof;

Figure 6 is a side elevation illustrating the manner in which the artificial tree branches are crinkled;

Figure 7 is a fragmentary detail, in elevation, showing one of the finished branches attached to the artificial tree stem or trunk, and also, illustrating the manner in which the tree stem or trunk is wrapped with a covering material;

Figure 8 is a horizontal section taken on the line 8—8 of Figure 7, looking in the direction in which the arrows point;

Figure 9 is an enlarged vertical section taken on the line 9—9 of Figure 7, looking in the direction in which the arrows point, and, Figure 10 is a perspective of the artificial tree stem or trunk, the intermediate portion of which has been broken away.

Having more particular reference to the drawing, in connection with which like characters of reference will designate corresponding parts throughout, my improved artificial tree preferably consists of a vertically disposed stem or trunk 1, made of a suitable length of wire of the proper gauge, the lower portion of which is right-angularly bent, as indicated by the numeral 2, and formed with a circular or ring-like supporting base 3; the stem and its base being preferably wrapped with a fabric or paper tape or like covering material designated by the numeral 4.

A multiplicity of branches, generally indicated herein by the numeral 5, are arranged upon and supported from the stem or trunk of the artificial tree, as is shown in the Figures 1 and 2. These branches 5 are preferably graduated in length, so that when they are arranged in assembled relationship upon the stem 1, the usual upward taper or formation of an actual Christmas tree will be simulated. Also, it is to be noted that the various branches 5 are relatively positioned at different angles so as to effect a more or less even distribution of the same entirely about the artificial tree formation so produced; the referred to arrangement being well shown in the Figures 1 and 3.

The branches 5, save for their formation in graduated lengths for the reason above explained, are substantially identical in construction or formation. Hence, in the subsequent description pertaining to these branches, reference is made to but one of the same for purposes of brevity.

The branch 5 consists of a single piece of non-opaque or light-permeable material 6, such for example, as cellophane or the like. The material may be of any desired color. The branch body piece 6 of the desired shape and length is folded substantially medially and longitudinally of itself into that form as illustrated in the Figure 5, thus producing a cross-sectionally inverted V-shaped formation. The longitudinally folded piece is now placed in a straddling-like manner over the elongated shank portion or rod 7 of a suitable forming device, preferably equipped with a handle 8 or its equivalent. When so engaged with the form, the flexible and pliant piece 6 is longitudinally crushed or densely crinkled thereupon, the ultimately crushed or densely crinkled piece being shown in such position upon the form 7 in the Figure 6 of the accompanying drawing. Following the longitudinal crushing, crinkling or pleating of the piece 6, in the manner above described, it is removed from the form 7 and the crinkles or pleats are partially distended. In this distension or elongation of the crinkles or pleats of the piece 6, it is to be noted that the intermediate crinkles or pleats are distended to a greater degree than are those adjacent the opposite ends of the piece 6, and in this manner, it will be observed that an upward curving of the artificial branch will be thus attained; also, that the opposite extremities of the artificial branch so formed will be curved upon themselves in the fashion indicated by the numeral 9.

The crinkled or pleated artificial branch is now provided with a coating of transparent adhesive material, such as glue, upon and over that portion of its underside or face adjacent and along the longitudinal fold, as designated at 10. This coating or layer of adhesive is permitted to become set upon the artificial branch, and obviously, when set, the same will serve to normally retain the branch in its previously adjusted crinkled and upwardly curved formation; also, it will be observed in this connection that the now set coating or transparent layer 10 will serve as a reenforce for the longitudinal and medial portion of the artificial branch, hence, rendering the same form-sustaining. Consequently, subsequent sagging of the artificial branch when it is attached in proper position upon the stem 1 will be materially lessened.

The artificial branch 5, constructed in accordance with the foregoing descriptive matter, is now engaged over the tree stem or trunk, preferably by piercing the intermediate portion thereof with the upper or free end of said stem 1, and then sliding or moving the branch downwardly upon such stem 1 until the desired or proper relative positioning thereof has been effected. To effect an anchoring connection between the thus engaged artificial branch and the tree stem 1, I may and preferably do apply a suitable type of adhesive to that portion of the under side or face of the branch in immediate proximity to the stem 1, pressing or squeezing the thus adhesively coated portion of the branch into contact with the adjacent portion of the stem 1 and holding it there until the adhesive becomes set or hardened.

In engaging the branch 5 upon or over the artificial tree stem 1, it is to be borne in mind that I preferably pierce the same with the free end of the stem 1 substantially adjacent the middle of said branch, thus, effecting a substantially even distribution of the opposite portions of the branch with respect to the said stem 1. Of course, in some instances, it may be desirable to engage the artificial branch 5 over the stem 1 slightly beyond or laterally of its medial portion, as for example, when a certain amount of irregularity of length of the artificial tree branches is wanted, possibly, for the purpose of a more natural simulation of an actual or real tree.

As hereinbefore stated, the lengths of the artificial branches 5 are graduated, i. e., they are progressively shortened, so that when they are engaged over the tree stem or trunk 1 in superposed relationship, an upward taper will be imparted to the artificial tree formation, thus simulating the shape of an actual tree.

At this point, it may be noted that by reason of the cross-sectionally inverted V-shaped formation of the branches 5, an effectual bracing is accorded the same throughout their respective areas. This formation, obviously, further enhances or betters the self or form-sustaining body characteristics of the branches, permitting them to be retained upon the tree stem 1, over a prolonged period of time, without excessive drooping or sagging. Furthermore, it will be understood that by reason of the aforesaid cross-sectionally inverted V-shaped formation of the branches 5, an increased surface is afforded the same, thus providing a greater light ray diffusing and refracting area therefor.

Due to the crinkled or pleated formation of the branches 5, it will be understood that light rays, colored or otherwise, directed onto the artificial tree will be diffused and refracted throughout the entire body of the product, hence, causing the same to produce a most pleasing character of glimmering eye effect.

Manifestly, the construction shown is capable of still further modifications, and such modification as is within the scope of my claims, I consider within the spirit of my invention.

I claim:

1. An ornamental device comprising a vertical supporting means, and a plurality of flexible and pliant light ray diffusing and refracting means attached to and supported from said supporting means in superposed relation and in substantially horizontal planes, said second mentioned means being formed with irregular surfaces throughout their respective areas, the degree of irregularity of the opposite end portions of said second mentioned means being greater than that of the intermediate portion thereof.

2. An artificial tree comprising a substantially vertical trunk-like support, a plurality of branches fixed to said support, each of said branches consisting of a single piece of pliant light-ray diffusing and refracting means formed with transversely disposed irregularities throughout its surface, and said pieces having those portions of the same opposite its approximately medial portion upwardly curved.

3. An artificial tree comprising a substantially vertical trunk-like support, a plurality of relatively superposed branches of different lengths fixed to said support, each of said branches consisting of a single piece of pliant light-ray diffusing and refracting means formed with transversely disposed irregularities throughout its surface and said piece having those portions of the same opposite its approximately medial portion upwardly curved.

4. An artificial tree comprising a substantially vertical trunk-like support, a plurality of branch-like pieces fixedly connected at approximately their respective medial portions to adjacent portions of said support, each of said branch-like pieces consisting of a single piece of pliant light-ray diffusing and refracting means formed with transversely disposed irregularities throughout its surface, those irregularities in said piece in proximity to its said approximately medial portion being of greater density than the remaining irregularities in the piece outwardly of and beyond said first mentioned irregularities, whereby to cause those portions of the piece opposite its said medial portion to be upwardly curved, and means on each of said pieces for retaining the upward curvature in their said opposite portions.

5. An artificial tree including a trunk-like support, a plurality of branches attached to said support, each of said branches consisting of a single piece of pliant light-reflecting means, and each of said pieces being formed with transversely disposed irregularities throughout its surface, and the pieces having those portions of the same opposite its approximately medial portion curved upon themselves to simulate the curvature of a natural tree branch.

GRACE M. McCOMB.